United States Patent
Merchant et al.

(10) Patent No.: US 6,321,988 B1
(45) Date of Patent: Nov. 27, 2001

(54) OPTICAL DEVICE EMPLOYING A PIEZOELECTRIC REFLECTOR ARRAY FOR INCREASING THE RESOLUTION OF A PHOTOSENSOR

(75) Inventors: Peter Merchant, Dorset (GB); Paul D. Stoner, North Canton, OH (US)

(73) Assignee: Telxon Corporation, Holtsville, NY (US)

( * ) Notice: Subject to any disclaimer, the term of this patent is extended or adjusted under 35 U.S.C. 154(b) by 0 days.

(21) Appl. No.: 09/642,998

(22) Filed: Aug. 21, 2000

(51) Int. Cl.⁷ ....................................................... G06K 7/10
(52) U.S. Cl. ................. 235/462.12; 235/472.01; 235/462.32
(58) Field of Search ......................... 235/462.12, 462.01, 235/462.32, 472.01

(56) References Cited

U.S. PATENT DOCUMENTS

| 4,818,886 | 4/1989 | Drucker . |
| 5,170,277 | 12/1992 | Bard et al. . |
| 5,521,367 | 5/1996 | Bard et al. . |
| 6,049,406 | * 4/2000 | Zocca .............................. 235/462.12 |

FOREIGN PATENT DOCUMENTS

0494647  *  7/1992  (EP) .

* cited by examiner

*Primary Examiner*—Harold I. Pitts
(74) *Attorney, Agent, or Firm*—Amin & Turocy, LLP

(57) ABSTRACT

The present invention relates to a dataform reading module. At least one photosensor provides a plurality of different zones for image capture. A lens focuses a respective image representing a portion of a dataform taken along a target line onto a respective one of the plurality of different zones. At least two piezoelectric reflectors are configured to focus an image of adjacent and partially overlapping portions of the dataform taken along the target line onto the lens. An illuminating device illuminates the dataform. The piezoelectric reflectors are configurable to vary the width of the overlapping portions, so that multiple samples of the same dataform can be taken. The piezoelectric reflectors can also be configured to eliminate the overlapping portions for a second reading.

37 Claims, 9 Drawing Sheets

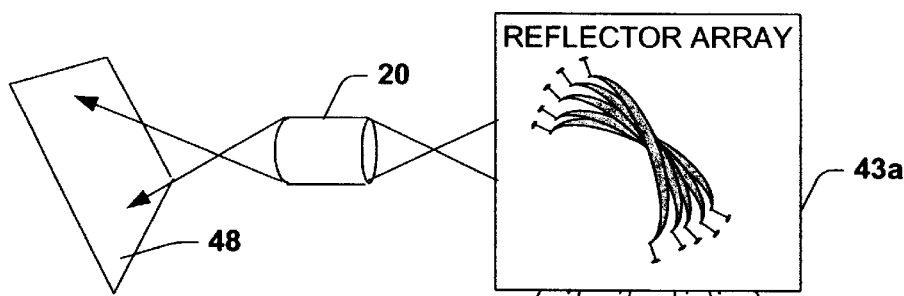
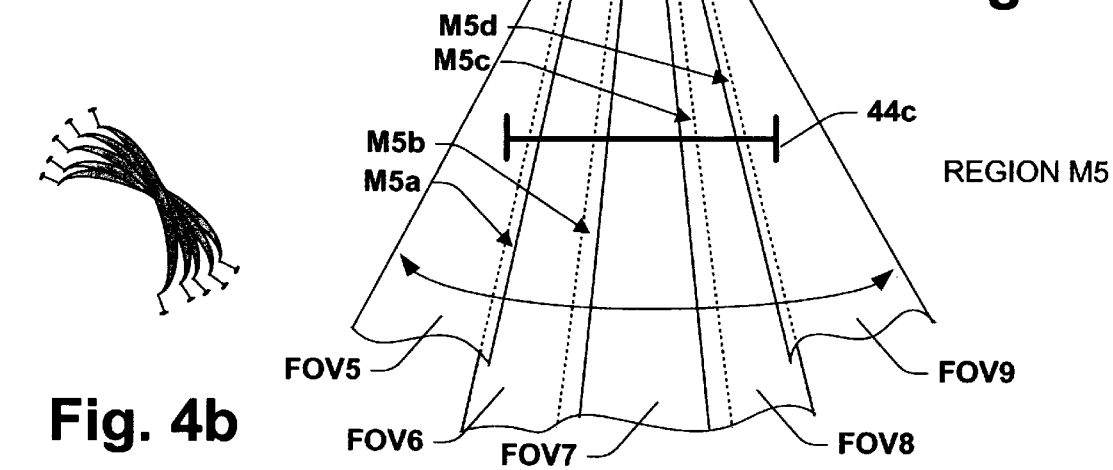
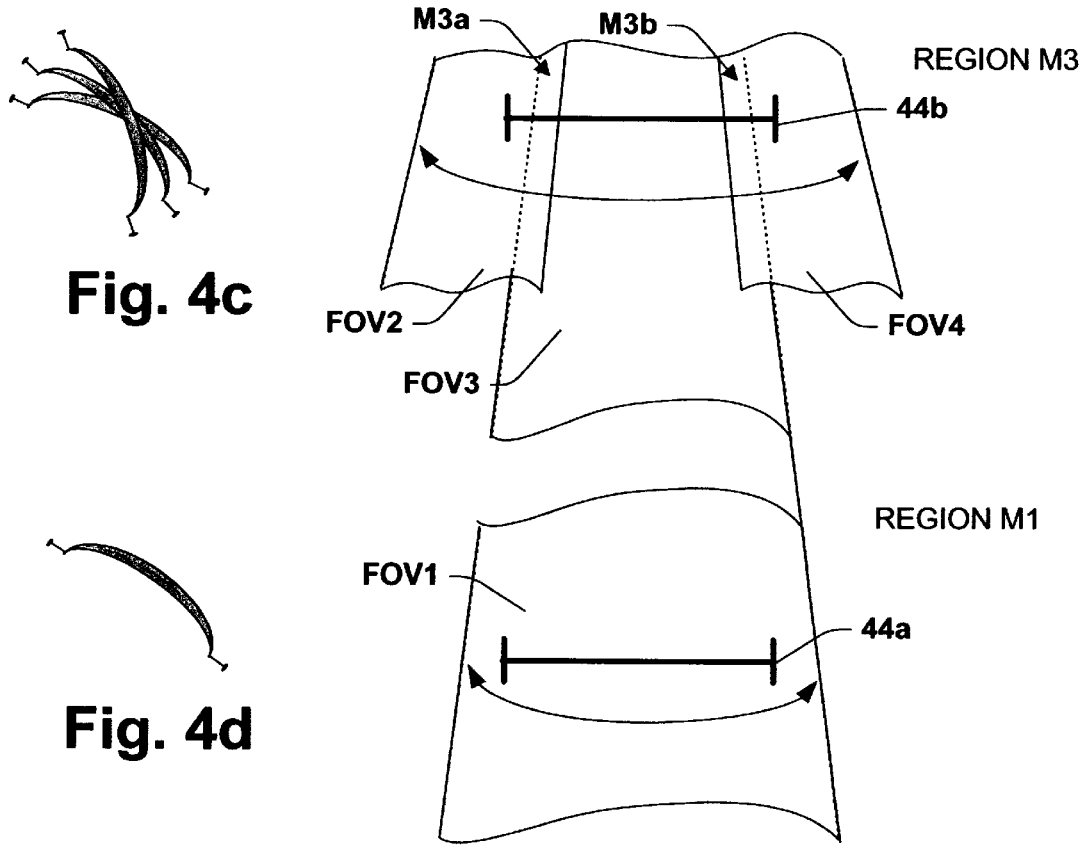
Fig. 4a
Fig. 4b
Fig. 4c
Fig. 4d

OPTICAL DEVICE EMPLOYING A PIEZOELECTRIC REFLECTOR ARRAY FOR INCREASING THE RESOLUTION OF A PHOTOSENSOR

FIELD OF THE INVENTION

The present invention relates to a portable data collection device including an imaging based dataform reader and, more particularly, to a portable data collection device including an imaging based dataform reader utilizing a piezoelectric reflector arrangement to increase apparent resolution of a photosensor.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, for inventory control, tracking, production control and expediting, quality assurance and other purposes.

Bar code dataforms come in a variety of different formats including one and two dimensional bar codes, matrix codes and graphic codes, as well as words and numbers and other symbols, which may be printed or etched on paper, plastic cards and metallic and other items. For example, a one dimensional bar code dataform typically consists of a series of parallel light and dark rectangular areas of varying widths. The light areas are often referred to as "spaces" and the dark areas as "bars". Different widths of bars and spaces define different characters in a particular bar code dataform.

Data originally encoded in a dataform is recovered for further use in a variety of ways. For example, a printed bar code may be illuminated to derive reflectance values which are digitized, stored in buffer memory and subsequently decoded to recover the data encoded in the bar code. The printed bar code may be illuminated using a laser, an array of LEDs, ambient light, or the like. The light reflected from the printed bar code typically is captured using a photosensor such as, for example, a CCD detector or CMOS detector.

A problem associated with conventional dataform readers is that the readers are designed to read dataforms located within a limited range therefrom. For example, a dataform reader may be designed to read dataforms located within the range of three inches to twelve inches from the reader. The maximum distance at which a dataform reader is able to read a dataform is limited by a resolution of the photodetector used to capture the dataform. For example, using a conventional 640 horizontal pixel photosensor, one dimensional bar code dataforms can be read so long as the distance the reader is placed from the dataform is such that the 640 horizontal pixels are suitable to distinguish among the narrowest bars and spaces forming the dataform. As the dataform reader is moved further away from a dataform, the images of the bars and spaces appear smaller at the photosensor thereby limiting the range at which the dataform reader is able to read a dataform.

One way to allow the dataform reader to read the dataform at longer distances is to increase the resolution of the photosensor. For example, rather than providing 640 horizontal pixels, the photosensor may include 1000 or more horizontal pixels. In this manner, the photosensor is able to distinguish among smaller features of the dataform thereby enabling reading of dataforms located farther away. A significant drawback to increasing the number of horizontal pixels on the photosensor is that a width of the photosensor becomes proportionately larger in order to accommodate the additional pixels. As the width of the photosensor increases, so does the overall width of the reader module. Unfortunately, due to customer demand for smaller and more compact dataform readers, the ability to increase the width of the reader module is often not a feasible option.

Accordingly, there is a strong need in the art for a dataform reader which is capable of reading dataforms at longer distances which overcomes the aforementioned drawbacks.

SUMMARY OF THE INVENTION

In accordance with one aspect of the present invention, a range at which a dataform reader is able to read a dataform is improved by increasing an apparent resolution of a photosensor capturing the image of the dataform. The apparent resolution of the photosensor is increased by providing a reader module having a piezoelectric reflector that scans an indicia and a single lens with partially overlapping fields of views. Each field of view is set to capture a respective portion of a full dataform image. For instance, the field of view from each piezoelectric reflector may be set to capture a respective portion of a one-dimensional bar code label. A voltage can then be applied to at least one of the piezoelectric reflectors so that the field of view of the piezoelectric reflector can be varied. This allows for a second reading in which the overlapping portions of the field of views is changed. The two readings can then be compared to determined the integrity of readings. A number of samples can be captured for the same dataform image, so that an optimal image reading can be obtained. Furthermore, the number of samples can be employed to determine if a reading is valid. For example, multiple readings can be taken and a valid reading can be determined based on any two readings matching. The piezoelectric reflectors can also be adjusted to eliminate the overlapping portions to obtain a maximum capture range of the pixels for a given dataform image.

In order to increase the apparent resolution of the photosensor, each of the piezoelectric reflectors is preferably arranged to focus a respective image of the dataform onto different zones of the photosensor. For instance, each piezoelectric reflector may be arranged to direct images onto rectangular shaped zones arranged vertically with respect to one another. Upon capturing an image from the lens in different zones, the full image of the dataform is reconstructed. In particular, the images from each zone is preferably provided to an image processor whereby overlapping data from each zone is accounted for and a single image representative of a combined field of view from the lens and piezoelectric reflectors is obtained. The integrity of the combined image can be improved by sampling the dataform a multiple number of times with different overlapping data. Since an image from each piezoelectric reflector is focused onto different zones and then combined, the apparent resolution of the photosensor is increased. For instance, if a multiple reflector dataform reader has a two-dimensional photosensor with 640 horizontal pixels and the piezoelectric reflectors are arranged to project respective images on three different rectangular zones of the photosensor, the apparent horizontal resolution of the photosensor increases from 640 pixels to 1920 (640×3) pixels less the number of pixels providing overlapping data in each zone. It will be appreciated that since the photosensor itself need not be increased in width to accommodate such higher horizontal resolution imaging, the overall width of the reader module may remain unchanged. Thus, the dataform reader is able to read dataforms at longer ranges by increasing the apparent resolution of the photosensor, without increasing the overall width of the reading module itself. Furthermore, by varying the reflection angle of the piezoelectric reflectors, the overlap portions of the field of view (FOV) can be eliminated maximizing the pixels captured for the dataform.

According to one aspect of the invention, a dataform reading system is provided. The dataform reading system includes at least one photosensor providing a plurality of different zones for image capture, a lens for focusing a respective image representing a portion of a dataform taken along a target line onto a respective one of the plurality of different zones, at least two piezoelectric reflectors configured to direct an image of adjacent and partially overlapping portions of the dataform taken along the target line onto the lens, and an illuminating device for illuminating the dataform.

According to another aspect of the invention, a dataform reader for reading a dataform is provided. The dataform reader includes a hand-sized portable housing having at least one lens, a reading module included within the housing, the reading module including, a photosensor array having a plurality of different zones, a plurality of piezoelectric reflectors for directing a respective image representing a portion of the dataform along a target line onto a respective one of the plurality of different zones, at least one lens configured to focus an image of adjacent and partially overlapping portions of the dataform along the target line, and an illuminating device for illuminating the dataform.

According to yet another aspect of the invention, a method for reading a dataform employing a dataform reading module is provided. The method includes the steps of focusing a plurality of images of a dataform onto respective zones of a photosensor array from at least two piezoelectric reflectors, at least two of the images received from the at least two piezoelectric reflectors corresponding to adjacent and partially overlapping segments of the dataform taken along a target line, and reconstructing a final image of the dataform taken along the target line from a combination of the plurality of images provided to the respective zones.

According to still yet another aspect of the invention, a dataform reading module is provided. The dataform reading module including means for capturing adjacent portions of images of a dataform including means for adjusting the width of the captured adjacent portions, means for receiving images of the captured adjacent portions of the dataform onto respective different regions of the means for capturing; and means for combining the images of the adjacent portions to a single image of the dataform.

According to another aspect of the invention, a dataform reading system is provided. The dataform reading system comprises at least one photosensor providing a plurality of different zones for image capture and a lens for focusing a respective image representing a portion of a dataform taken along a target line onto a respective one of the plurality of different zones. The system further comprises at least two piezoelectric reflectors configured to direct an image of adjacent and partially overlapping portions of the dataform taken along the target line onto the lens, and an illuminating device for illuminating the dataform. An imaging processing circuitry is provided that is configured to receive pixel data from each zone of the at least one photosensor and take a first reading of the dataform captured along the target line. The imaging processing circuitry is further configured to adjust a reflecting angle of at least one of the at least two piezoelectric reflectors and take a second reading of the dataform captured along the target line. The image processing circuitry compares the partially overlapping portions of the first and second reading and discards the overlap portions of the dataform during reconstruction of a final image.

According to another aspect of the invention, a dataform reading system, is provided. The dataform reading system comprises at least one photosensor providing a plurality of different zones for image capture and a lens for focusing a respective image representing a portion of a dataform taken along a target line onto a respective one of the plurality of different zones. The system further comprises at least two piezoelectric reflectors configured to direct an image of adjacent and partially overlapping portions of the dataform taken along the target line onto the lens, and an illuminating device for illuminating the dataform. An imaging processing circuitry is provided that is configured to receive pixel data from each zone of the at least one photosensor and take a first reading of the dataform captured along the target line. The imaging processing circuitry is further configured to adjust a reflecting angle of at least one of the at least two piezoelectric reflectors for eliminating the overlapping segments of the dataform for a second reading.

In another aspect of the invention, a plurality of piezoelectric reflectors are mounted on an arc, such as a larger piezoelectric arc. This allows each of the plurality of piezoelectric reflectors to be focused along the same vertical line. The curvature of the large piezoelectric arc can be controlled by a second piezoelectric element by comparing intensity of reflected light from a point source.

In yet another aspect of the invention, a plurality of piezoelectric reflectors capture a dataform that is smaller than the total field of view of the dataform reader. One of the piezoelectric reflectors measures the length of the dataform. This information is employed to expand the actual size of the captured dataform to fill the area of a photosensor array providing better resolution of small bar codes.

These and other aspects, features and advantages of the invention will become better understood from the detailed description of the preferred embodiments of the invention which are described in conjunction with the accompanying drawings.

BRIEF DESCRIPTION OF THE DRAWINGS

FIG. 4a is a top view of a mirror array and image regions for use with the portable data collection device in accordance with one aspect of the present invention;

FIG. 4b is a perspective view of a portion of the mirror array for use with the portable data collection device in accordance with one aspect of the present invention;

FIG. 4c is a perspective view of another portion of the mirror array for use with the portable data collection device in accordance with one aspect of the present invention;

FIG. 4d is a perspective view of a single portion of the mirror array for use with the portable data collection device in accordance with one aspect of the present invention;

DETAILED DESCRIPTION OF THE INVENTION

Figure 1:
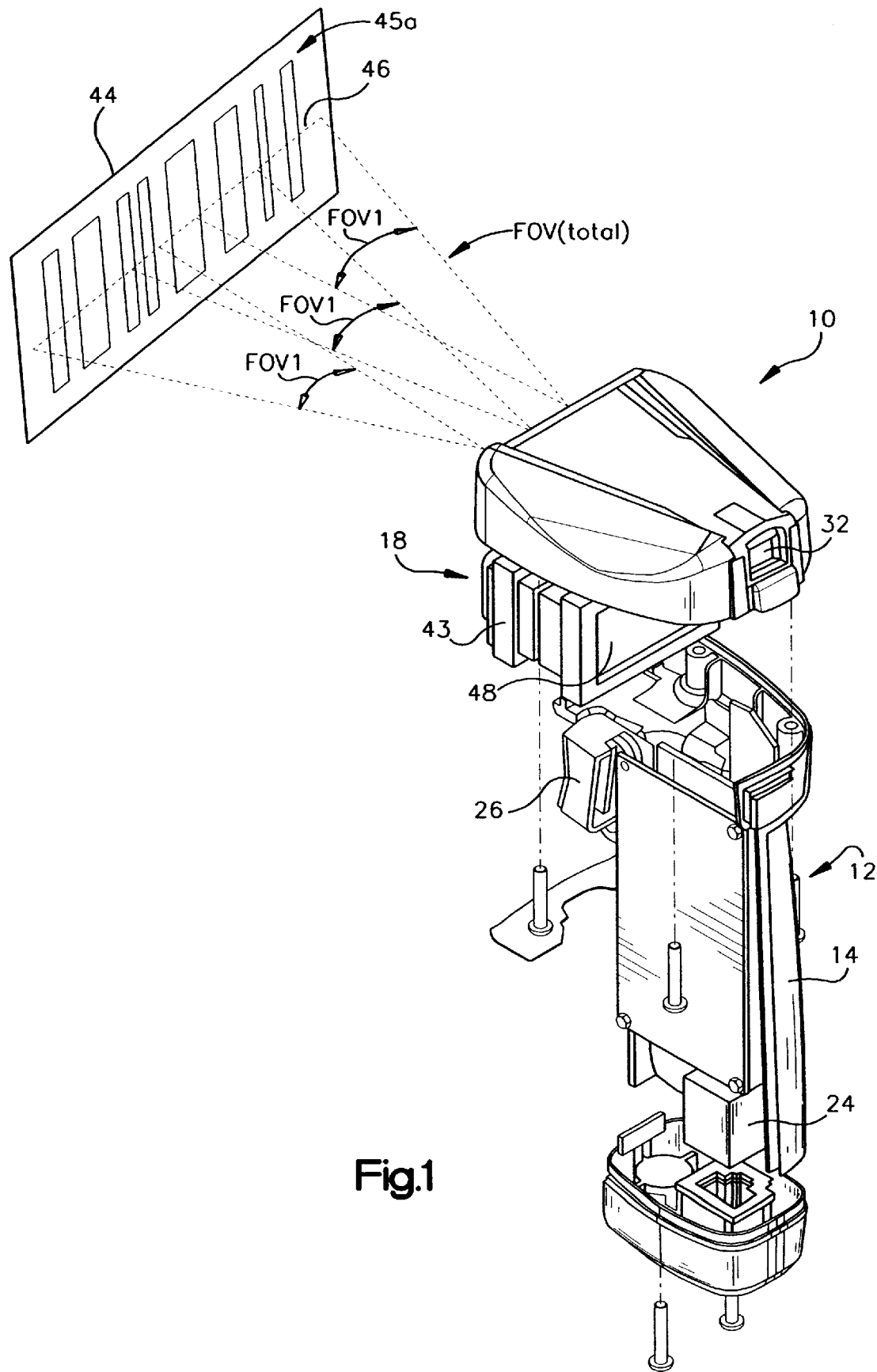
FIG. 1 is a partial exploded view of a portable data collection device in accordance with one aspect of the present invention.

The present invention will now be described with reference to the drawings wherein like reference numerals are used to refer to like elements throughout. The present invention provides for a piezoelectric reflector array that reflects different regions of an image onto a photosensor array. The reflection angles of the piezoelectric reflectors can be adjusted for redundant reading and checking to ensure reading integrity. Present reflector systems only allow for a single reading due to the fixed nature of the reflectors. Integrity of the image can only be validated utilizing overlapping fields of view. However, the present invention allows for multiple data sampling of the same image along different regions. The data sampling can be utilized to verify the integrity of the reading or to eliminate overlaps in readings of particular regions, so that the maximum number of pixels can be captured for each image.

Turning to FIG. 1, a portable, hand held data collection device in accordance with the present invention is shown generally at 10. The portable data collection device 10 includes a photosensor array imaging assembly 18 which is capable of imaging a target dataform 45a located within an imaging target area 44 of the imaging assembly 18. As will be described more fully below, the imaging assembly 18 includes a multiple piezoelectric reflector system and a single lens assembly wherein each piezoelectric reflector provides to the lens partially overlapping field of views FOV1 through FOV9, respectively. Each piezoelectric reflector is arranged to direct an image received from the fields of view along a target line 46 to a respective different zone of a photosensor array 48 (see FIG. 4a). An image processing circuit coupled to the photosensor array 48 receives pixel data from each zone of the photosensor array 48 and reconstructs the image directed by a collection of piezoelectric reflectors along the target line 46. In particular, the image processing circuit correlates the image data received from each piezoelectric reflector in order to discard overlapping data and stream together the data across the entire field of view FOV$_{total}$ for the collection of piezoelectric reflectors. Since each piezoelectric reflector directs an image through a single lens on a different rectangular zone of the photosensor array 48, the apparent resolution of the photosensor array 48 in reading data along the target line 46 is increased since more pixels are available for capturing images across the entire field of view FOV$_{total}$. This, in turn, enables the portable data collection device 10 to read dataforms at longer ranges without increasing a width of the photosensor array imaging assembly 18.

The data collection device 10 includes a housing 12 defining an interior region for containing various mechanical and electrical components as described herein. The housing 12 includes a gripping portion 14 sized to be grasped in the hand of an operator. Coupled to the housing 12 is a dataform reading switch or actuator 26. The dataform reading trigger 26 is positioned to be depressed by an index finger of the operator while the gripping portion 14 of the housing 12 is held in the operator's hand. Also supported within the housing 12 is a power source 24 such as a rechargeable battery for supplying operating power to the portable data collection device 10.

The housing 12 also includes a small opening through which a portion of an indicator light emitting diode (LED) 32 is visible. The indicator LED 32 alternates between three colors. The color green is displayed by the indicator LED 32 when the device 10 is on standby, ready for use. The color orange is displayed with the device 10 has successfully completed an operation such as decoding a target dataform. The color red is displayed when the device 10 is not ready to perform an operation.

Figure 3:
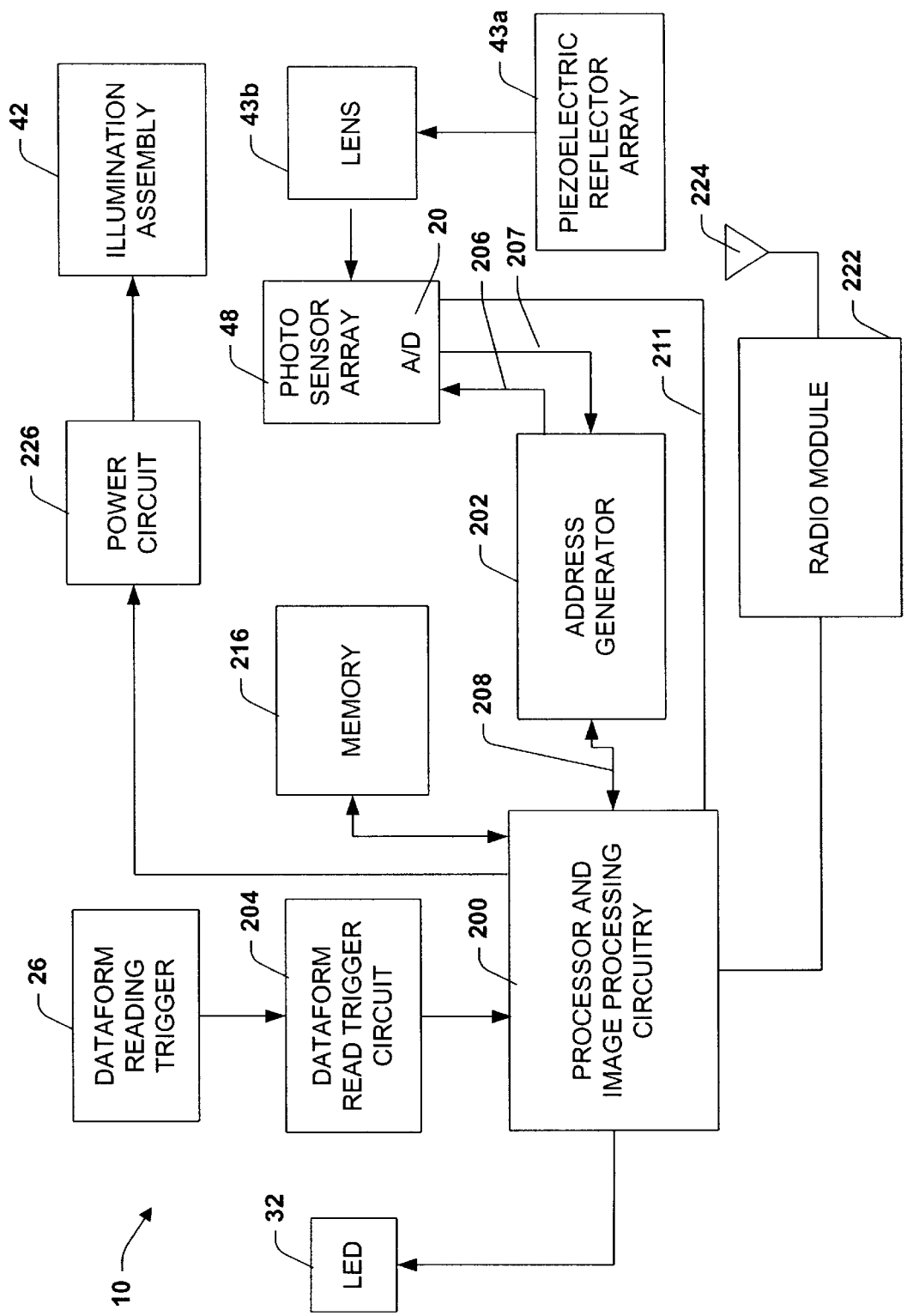
FIG. 3 is a block diagram of the components of the portable data collection device in accordance with one aspect of the present invention.
Figure 5A:
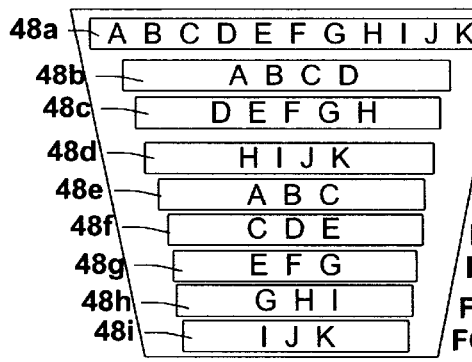
FIG. 5a is a diagrammatic view of a photosensor array capturing images of a dataform in multiple zones in accordance with one aspect of the present invention.
Figure 5B:
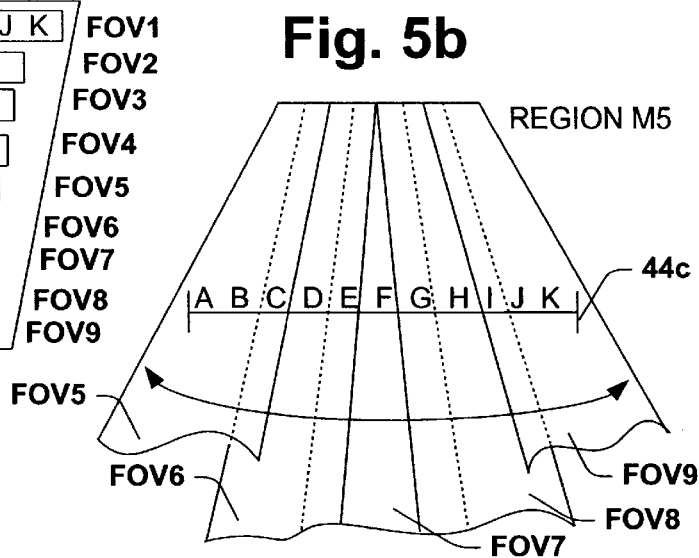
FIGS. 5b–5d are top views of various image regions related to the photosensor array of FIG. 5a in accordance with one aspect of the present invention.
Figure 5C:
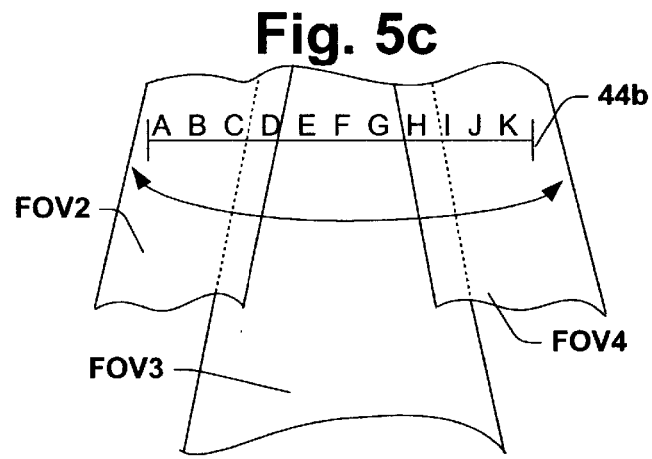
Figure 5D:
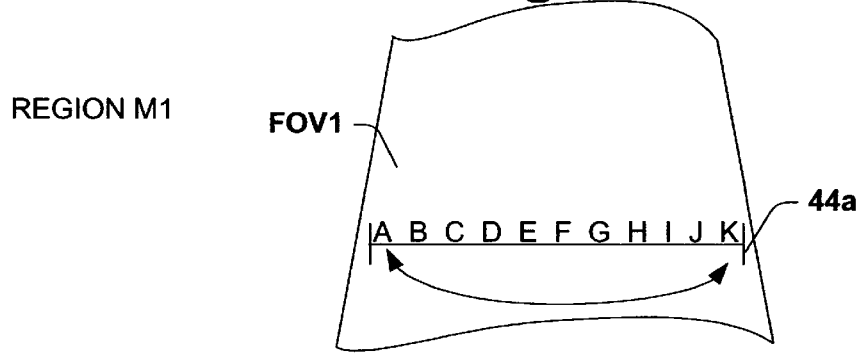

The imaging assembly 18 is disposed within a top portion of the housing 12 and includes the lens (not shown), piezoelectric reflector assembly 43, photosensor array 48 and illumination assembly 42 (FIG. 3). In the present embodiment of the invention, the illumination assembly 42 is a laser assembly, however, it will be appreciated that various other illumination sources such as an array of LEDs could alternatively be used.

Figure 2A:
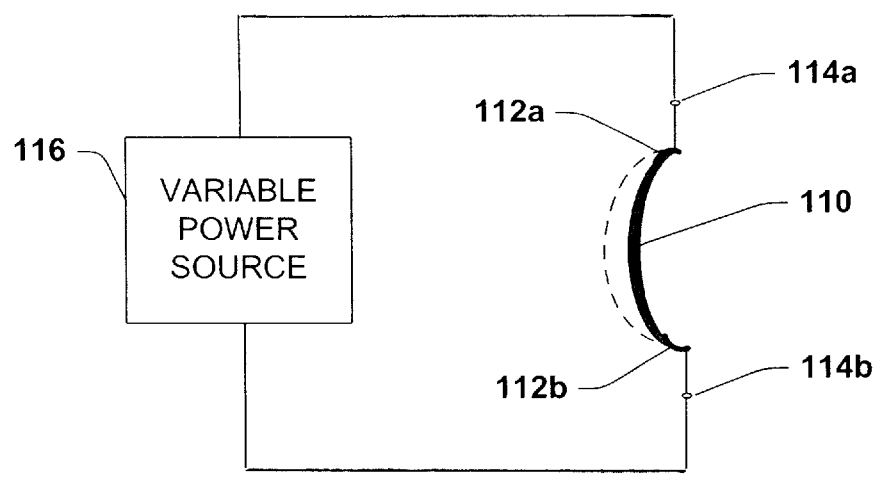
FIG. 2a is schematic diagram of a piezoelectric reflector coupled to an adjustable DC power source in accordance with one aspect of the invention.

FIG. 2a illustrates the operation of a piezoelectric reflector 110 in accordance with the present invention. The piezoelectric material 110 is mounted in the form of a radially defined arc at non-movable fixed locations 112a and 112b. Affixed to the piezoelectric material 110 are electrodes 114a and 114b which are connected to a variable power source 116 (e.g., DC power). When voltage is applied by the variable power source 116 to the piezoelectric material 110, the radially defined arc of the piezoelectric material 110 is caused to expand and/or contract in a radially defined direction as depicted by the dotted line in FIG. 2a. The variable power source 116 allows for voltage applied to the piezoelectric reflector 110 to be varied resulting in the adjustment of the reflection angle of the piezoelectric reflector 110. This allows for adjustment of the FOV for each piezoelectric reflector in the system. The system can utilize these piezoelectric reflector adjustments to capture additional samples of the same indicia for redundant checking of the indicia. For example, three readings (samples) maybe taken and the readings compared to each other. A match between any two or more readings can be considered a valid reading, which is then employed by the system. In addition, several readings can be taken to adjust the piezoelectric reflector to eliminate the overlap between FOVs, so that the number of pixels for each reading can be maximized. Furthermore, the piezoelectric may be mounted on a large arc that is itself a piezoelectric reflector, so that each piezoelectric reflector can be focused along the same vertical line. The arc can be adjusted by measuring the light intensity along the vertical line by yet another piezoelectric reflector. In some situations the field of view is larger than the actual barcode. In this situation, an additional piezoelectric reflector may be employed to measure the length of the barcode, so that the captured dataform may be expanded to cover the entire field of view that the photosensor can capture. As will be described in more detail below, the radially-arced surface 110 is polished to provide a reflecting radial surface to direct an image toward a photosensor array.

Figure 2B:
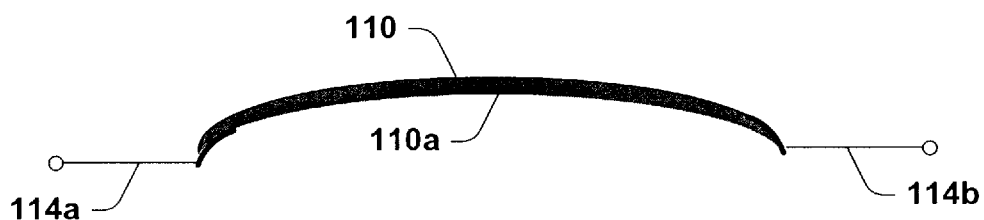
FIG. 2b is a top view of a piezoelectric reflector in accordance with one aspect of the invention.

Now referring to FIG. 2b, a detailed drawing of the radially-arced piezoelectric material 110 is shown. The piezoelectric material 110 has a polished surface 110a for reflecting an image to area on a photosensor array. Polishing may be achieved by applying well known chemical or mechanical processes on the surface 110a. As shown, electrodes 114a and 114b are attached to a first and second end of a single layer of piezoelectric material 110. When voltage is applied to the ends of the material as shown in FIG. 2a, the curvature of the formed arc changes because of an elongation in the crystalline structure of the piezoelectric material 110. A plurality of various piezoelectric materials may be employed as long as the crystalline structure of the material is conformable to an arc and is suitable for polishing. By forming an arc to provide a reflection angle, the present invention provides several advantages over conventional systems. For example, the arc affords a variable reflection angle from a single layered piezoelectric material. A small movement in the arc allows for a wide reflection pattern on the photosensor array. This provides a wide-angle reflection system formed from a single layer of low cost piezoelectric material. Many conventional systems employ multiple layers of material or rely on complicated structures in order to produce necessary reflection angles. Another advantage of the radially formed arc is that manufacturing costs may be reduced since the low cost piezoelectric material is readily mounted to a printed circuit board at two fixed locations 112a and 112b.

Figure 2C:
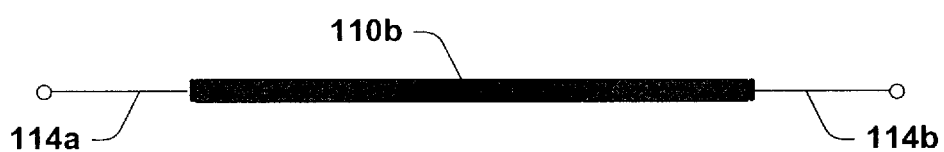
FIG. 2c is a top view of an alternate piezoelectric reflector in accordance with one aspect of the invention.

Turning now to FIG. 2c, another embodiment of the present invention is illustrated. In this embodiment, the piezoelectric material 110b is formed as a straightened single layer with electrodes 114a and 114b attached at opposing ends as shown in FIG. 2b. A metallic reflective foil is radially formed and attached to both ends of the piezoelectric material 110b. As voltage 116 is applied, the piezoelectric material lengthens and contracts in a straight line causing a radially formed arc in the metallic foil to radially deflect inward or outward. As described above, when the radially formed metallic arc moves, a variable reflection angle is provided to direct an image to a photosensor array.

Figure 2D:
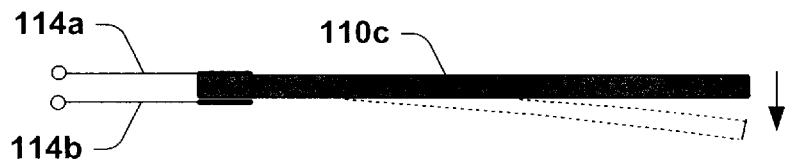
FIG. 2d is a top view of yet another alternate piezoelectric reflector in accordance with one aspect of the invention.

It is to be appreciated that many embodiments for deploying a radially-arced deflection system are possible. For example, referring to FIG. 2d, another embodiment of the present invention is illustrated. A piezoelectric material 110c is shown in FIG. 2d, with electrodes 114a and 114b at the same end of the material. When a voltage is applied to the piezoelectric material 110c, a bend may occur in the direction of the arrow toward the dotted line as shown, for example. Bends may occur in the opposite direction if an opposite polarity voltage is applied.

Turning now to FIG. 3, a block diagram of the data collection device 10 is provided. A microprocessor 200 controls the various operations and performs image analysis in decoding a target dataform as is described more fully below. The microprocessor 200 is programmed to carry out the various control and processing functions utilizing conventional programming techniques. A memory 216 coupled to the microprocessor 200 serves to store the various programs and other data associated with the operation of the data collection device 10 as described herein. A person having ordinary skill in the art will be able to program such operations without undue effort. Hence, additional detail is omitted for sake of brevity.

The microprocessor 200 is coupled to an address generator 202, via a local bus 208, which is designed to output a sequence of pixel addresses corresponding to a desired pixel data readout pattern from photosensor array 48. For example, as discussed in more detail below, the microprocessor 200 may be configured to read out consecutive horizontal lines of pixel data from multiple zones so that such pixel data can be processed to reconstruct the entire dataform provided within the field of view $FOV_{total}$ of the data collection device 10. The addresses are provided from the address generator 202 to the photosensor array 48 via an address bus 206. The photosensor array 48 provides, as its output data, pixel data on data bus 207 which corresponds to the address provided on bus 206. The address generator 202 in turn provides the pixel data to the microprocessor 200 via bus 208. Data may therefore be collected from the photosensor array 48 substantially in real time according to a predefined data readout pattern. It will be appreciated that while the present embodiment depicts the address generator 202 to be physically separated from the photosensor array 48, it is possible for both components to be provided on a single chip.

In order to carry out a dataform reading operation, the operator points a piezoelectric reflector array 43a towards the target dataform. Light is directed by the piezoelectric reflector array 43a to a lens 43b which focuses the light on the photosensor array 48. The operator then initiates the dataform read operation via the trigger 26 or other methods. The dataform read trigger circuit 204 generates an interrupt signal which is provided to the microprocessor 200 indicating initiation of a dataform reading operation. The microprocessor 200 communicates with the address generator 202 via the control bus 205 which causes the address generator 202 to begin generating addresses for the predefined readout pixel pattern.

The image data from the photosensor array 48 consists of digital data indicative of the instantaneous illumination of the pixel. In the exemplary embodiment, it is assumed that the target dataform 45b is made up of a series of black and white bars/spaces. The photosensor array 48 includes an analog to digital (A/D) converter 210 for converting analog pixel data obtained from the addressed pixels to digital pixel data. The A/D converter 210 has gain which may be selectively adjusted via a gain adjust control signal provided on line 211 from the microprocessor 200. The digitized pixel data from the photosensor array 48 is provided via the address generator 202 to the microprocessor 200. The microprocessor 200 evaluates the range of the acquired pixel data to determine if the full range of the A/D converter 210 is utilized. If not, the microprocessor 200 adjusts the gain of the input to the A/D converter 210. The microprocessor 200 then proceeds to decode the image of the target dataform for the entire field of view $FOV_{total}$ as discussed in more detail below. The microprocessor 200 then adjusts the reflection angle of any or all of the piezoelectric reflectors in the piezoelectric reflector array 43a, and repeats the reading and decoding. The second reading can be compared to the first reading to determine if an accurate reading of $FOV_{total}$ has occurred.

The data collection device 10 further includes a radio module 222 and antenna 224 for wirelessly transmitting and receiving data with remote devices. Additionally and/or alternatively, the data collection device 10 may include a serial or parallel I/O port (not shown) for communicating data with external devices.

The microprocessor 200 is coupled to the illumination assembly 42 via power circuitry 226 which enables the microprocessor 200 to control the illumination assembly 42 to provide general illumination and targeting during operation. As mentioned above, the illumination assembly 42 of the present embodiment may employ any of various light sources wherein output light is sculpted to be spread across a dataform. The microprocessor 200 is coupled to the LED 32 to adjust color state so as to exhibit current mode of operation.

Turning now to FIGS. 4a–4d, the piezoelectric reflector array 43a of the present embodiment of the invention is shown in more detail. The piezoelectric reflector array 43a (shown as a top view) of the present embodiment includes a plurality of piezoelectric reflectors stacked vertically and each arranged at an angular offset with respect to one another. Five piezoelectric reflectors in the vertical stack are grouped as shown in FIG. 4b and are directed to region M5. Three of the stacked piezoelectric reflectors are shown in FIG. 4c and are directed to region M3, and a single piezoelectric reflector is shown in FIG. 4d covering region M1. Each of the piezoelectric reflector groupings is responsible for a particular field of view (FOV) of various regions which are spaced at a variable distance from the piezoelectric reflector array 43a. Region M1, covering FOV1 provides a far FOV for target scanning distances from about 12 inches to about 20 inches. Region M3, covering FOV2, FOV3, and FOV4 provides a middle range FOV for target scanning distances from about 6 inches to about 12 inches. Region M3, covering FOV5, FOV6, FOV7, FOV8 and FOV9 provides a short FOV for target scanning distances from about 1 inch to about 6 inches. A target area 44a, 44b, and 44c is shown at variable distances from the piezoelectric reflector array 43a. For illustrative purposes, target 44a is depicted at about 20 inches (not shown to scale) from the piezoelectric reflector array, target 44b is approximately 10 inches (not shown to scale) from the piezoelectric reflector array, and target 44c is about 5 inches (not shown to scale) from the piezoelectric reflector array. As will be described in more detail below, the target image 44 is directed to a single telephoto lens 43b which focuses the received image onto the photosensor array 48.

By observing the particular regions M1, M3, and M5, the workings of the present invention may be illustrated. As shown, the vertically stacked piezoelectric reflectors provide a variable receiving distance from the target area 44 and facilitate increasing apparent horizontal resolution of the photosensor array 48. For example, a three inch target may be completely viewed from the single piezoelectric reflector shown in FIG. 4d when the target 44a is at 20 inches. The single piezoelectric reflector provides a far $FOV_{total}$ of about 10 degrees. As the three inch target 44b is moved closer (6 to 12 inches) to the piezoelectric reflector array, however, additional piezoelectric reflectors are provided to expand the FOV so that the entire target is still within the horizontal scanning distance of the photosensor array 48. The three vertically stacked piezoelectric reflectors shown in FIG. 4c provide a middle range $FOV_{total}$ of about 28 degrees. Each piezoelectric reflector, having a singular FOV of about 10 degrees is arranged at an angular offset from one another such that an approximate two degree image overlap exists at the distance of about 12 inches. The three piezoelectric reflectors when arranged with the two degree overlap provide two overlapping image regions M3a and M3b. At about 12 inches therefore, the middle range $FOV_{total}$ is calculated as shown in Equation 1 below.

$$FOV_{total}=(M_N \times FOV_M)-(O_N \times O_D) \qquad \text{Equation 1}$$

$M_N$=Number of Piezoelectric reflectors
$FOV_M$=FOV of each piezoelectric reflector
$O_N$=Number of overlaps
$O_D$=Degree of overlap For the middle range FOV then, $FOV_{total}=(3*10)-(2*2)=$ 28 degrees.

When the three inch target is moved even closer (about 1 to 6 inches) to the piezoelectric reflector array 43a, five vertically stacked piezoelectric reflectors each having a singular FOV of about 10 degrees are employed as shown in FIG. 4b to increase the short $FOV_{total}$ to about 42 degrees. The five piezoelectric reflectors are arranged as described above to provide a two degree image overlap at about 6 inches. The two degree image overlap provides overlap regions M5a, M5b, M5c and M5d in region M5. From Equation 1, the short $FOV_{total}$ is computed as $(5*10)-(4*2)=$ 42 degrees. The piezoelectric reflectors can then be adjusted to vary the reflection angle of the reading so that a second sample can be taken with a different overlap range. The second sample and first sample can then be compared with the overlaps to determine if an accurate reading has occurred. In addition, the reflection angles can be adjusted until the overlap is eliminated.

Image regions M1, M3, and M5 are directed to separate regions of the photosensor array 48 via the telephoto lens 43b. A particular advantage of the present invention is that a singular high quality lens combined with a plurality of low cost, vertically arranged piezoelectric reflectors provides an economical solution for receiving targets from variable distances with increased resolution. The telephoto lens 43b provides a FOV of about ten degrees in the preferred embodiment, however, the FOV of the lens may be from about 5 degrees to about 15 degrees. The lens should be capable of viewing at least a three inch target at about 20 inches.

The telephoto lens 43b directs the received target image to a tilted photosensor array 48. As shown in FIG. 4a, the photosensor array is tilted to provide optimal focus of the three regions M1, M3, and M5. Tilting of the photosensor array facilitates a focus change from about one to 20 inches and illustrates another advantage of the present invention. Tilting allows a singular lens to provide a plurality of focus regions on the photosensor array 48. If the photosensor array was not tilted, additional lenses may be required to focus the various image regions M1, M3, and M5. As will be described in more detail below, tilting causes a trapezoidal effect on the received image at the photosensor array. Therefore, the tilt is adjusted to provide optimal focus of the various image regions and to provide maximum image resolution in the horizontal direction of the photosensor array 48.

By focusing the respective fields of view for each piezoelectric reflector on different zones on the photosensor array 48 which are arranged in a vertical fashion with respect to one another, an apparent resolution for the entire field of view $FOV_{total}$ is increased.

Turning now to FIGS. 5a–5d, the manner in which the telephoto lens 43b focuses an image from the piezoelectric reflector array 43a onto respective zones 48a through 48i of the photosensor array 48 is depicted. For sake of example, it is shown that region M1 depicted in FIG. 5d corresponds to field of view FOV1 and projects an image onto zone 48a of the photosensor 48. The region M3 shown in FIG. 5c corresponds to field of view FOV2, FOV3 and FOV4 and projects an image onto zones 48b, 48c, and 48d, and the region M5 corresponds to field of view FOV5 through FOV9 and projects an image onto zones 48e through 48i. Due to the overlap between the fields of view FOV2 through FOV9 (FOV1 provides a singular FOV with no overlap), a portion of the dataform (which in the present example is a list of alphabetical characters) may be duplicated in each zone 48b through 48i. Thus, for example, zone 48b includes the characters "A B C D", zone 48c includes the characters "D E F G H" and zone 48d includes the characters "H I J K". When the target image is in the short field of view as shown in FIG. 4b, a similar pattern occurs as depicted in zones 48e through 48i. The redundancy provided by the overlapping fields of view provides added assurance that the dataform across the entire field of view is read in its entirety. Assurance can also be added by varying the reflector angles of the piezoelectric reflectors and taking a second reading and comparing the overlap of the first reading with the second reading.

It will be appreciated that because a plurality of horizontal zones 48a through 48i of the photosensor array 48 is employed to read the dataform, the total number of pixels used to capture the dataform is significantly increased. For example, in the middle region M3 in the present embodiment, the apparent horizontal resolution of the photosensor array 48 is equal to its horizontal pixel width (640) times the number of zones utilized (3) minus the number of pixels which include duplicate data due to the overlapping field of views FOV2, FOV3, and FOV4. In the present example, both zones 48c and 48d include approximately 160 pixels of overlapping data. Accordingly, the apparent horizontal resolution of the photosensor array 48 in the present embodiment is approximately 1600 pixels ((640×3)−(2× 160)=1600) for the middle region M3. A similar analysis maybe performed on the short FOV region M5. Due to such higher resolution, it is possible to read dataforms more accurately and at further distances than is possible with lower resolution image capture. It will be appreciated that while the present example provides for employing nine piezoelectric reflectors covering three regions, the present invention is intended to apply to any configuration having at least two piezoelectric reflectors. Furthermore, while the present embodiment depicts increasing the apparent "horizontal" resolution of the photosensor array 48, it will be appreciated that the apparent resolution of the photosensor array 48 may be increased in any direction including a vertical direction or other angular directions and the present invention is not limited to increasing the apparent "horizontal" resolution.

In order to properly identify the dataform captured onto the photosensor array 48, image processing circuitry built into the processor 200 (FIG. 3) is configured to sense and discard duplicate data from each of the zones 48b through 48i and stream together the remaining pixel data to obtain the final image. The manner in which the duplicate data may be sensed and discarded is in accordance with various known video correlation techniques. For example, given the pre-known angular piezoelectric reflector arrangement, the microprocessor 200 in one embodiment is pre-programmed to know which pixels in each zone 48b through 48i correspond to overlapping data. For instance, in zone 48c, pixels 1–175 are known to be duplicate with the final 175 pixels in zone 48b, and in zone 48d pixels 1–175 are known to be duplicate with the final 175 pixels in zone 48c. Based on such preknown overlapping pixels, the image processing circuitry within the microprocessor 200 is configured to discard the overlapping pixels and stream the remaining data together to obtain the imaged dataform along the target line 46 (FIG. 1). It will be appreciated that in addition to directly discarding pixel data known to be overlapping, the image processing circuitry within the microprocessor 200 may also perform a comparison function to aid in ensuring that only duplicate data is discarded. For example, prior to discarding pixel data, data in one zone may be compared with the pixel data in a previous zone to confirm that only duplicate pixel data is discarded. In this manner, a built in safe guard is provided to protect against discarding pixels which are not duplicate. It is to be further appreciated that by adjusting the reflection angle of each piezoelectric reflector, a second reading can be taken and compared with the results of the first reading to further ensure the integrity of the reading. The adjustment of the reflection angle can also be used to zero out the overlap by making several adjustments and readings until the maximum pixel result is obtained.

As discussed above, the photosensor array 48 is tilted to provide optimal focus of the dataform image from about one to twenty inches. As can be seen from FIG. 5a, tilting causes the image to have a trapezoidal shape whereby the short FOV region M5 projects a smaller horizontal distance across the photosensor than the middle and far FOV regions M3 and M1. Consequently, the photosensor should be tilted (depending on the FOV of the telephoto lens) to provide optimal focus of regions M1, M3, and M5 and to guarantee the entire dataform (A through K) appears at zone 48a when positioned at about 20 inches. Likewise, the image should be brought to within about one inch of the piezoelectric reflector array and the tilt verified to guarantee the entire dataform (A through K) appears in zones 48e through 48i. Upon determining the proper tilt angle, the photosensor array may be subsequently mounted at the optimal determined angle for the given telephoto lens.

In another aspect of the invention, the piezoelectric reflector array 43a is mounted on an arc, such as a larger piezoelectric arc. This allows each of the plurality of piezoelectric reflectors to be focused along the same vertical line. The curvature of the large piezoelectric arc can be controlled by a second piezoelectric element by comparing intensity of reflected light from a point source. In yet another aspect of the invention, the piezoelectric reflector array 43a capture a dataform that is smaller than the total field of view. One of the piezoelectric reflectors measures the length of the dataform. This information is employed to expand the actual size of the captured dataform to fill the area of a photosensor giving better resolution of small bar codes.

Figure 6:
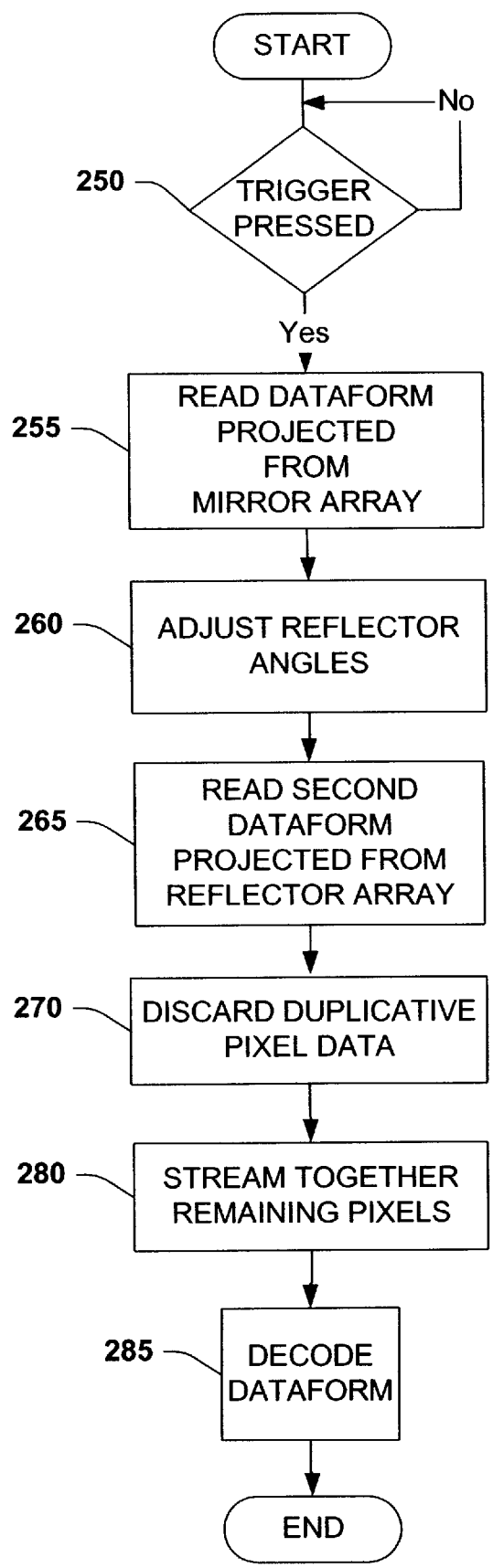
FIG. 6 is a flowchart representing the operation of the portable data collection device in accordance with one aspect of the present invention.

Turning now to FIG. 6, a flow chart depicting operations of the microprocessor 200 in reading a dataform 45a is shown. In particular, beginning at step 250, the microprocessor 200 initially determines whether the trigger 26 has been activated. If the trigger 26 has not been activated, the processor 200 returns to step 250. If, on the other hand, the trigger 26 has been activated, the processor 200 proceeds to step 255. In step 255, the processor 200 captures the dataform image in accordance with the techniques discussed above. In particular, using a laser illumination assembly 42 and the piezoelectric reflector array 43a, the dataform 45a is captured on respective zones 48a through 48i of the photosensor array 48 so as to increase the apparent horizontal resolution of the photosensor array 48. In step 260, the processor 200 adjusts the reflector angles to vary the overlap portions in the FOV of the reflectors. In step 265, the processor 200 captures a second dataform image in accordance with the techniques discussed above. Next, in step 270, the processor 200 receives the pixels data read out from each zone from both images and processes the data to remove duplicate pixel data resulting from overlap in the field of views of the piezoelectric reflector array 43a. Following the removal of duplicate pixel data, the processor 200 in step 280 streams together the remaining pixel data from each zone of the photosensor array 48. Finally, in step 285, the processor 200 decodes the data stream extrapolated from the respective zones 48a through 48i. Accordingly, the data collection device 10 is able to read dataforms at a higher apparent resolution without the need to increase the width of the imaging assembly 18. As mentioned above, such higher resolution imaging allows the data collection device 10 to read dataforms 48a located farther away thereby extending the reading range of the device 10. In addition, the data collection device 10 is able to take multiple samples of the same dataform to ensure the integrity of the dataform read.

Figure 7:
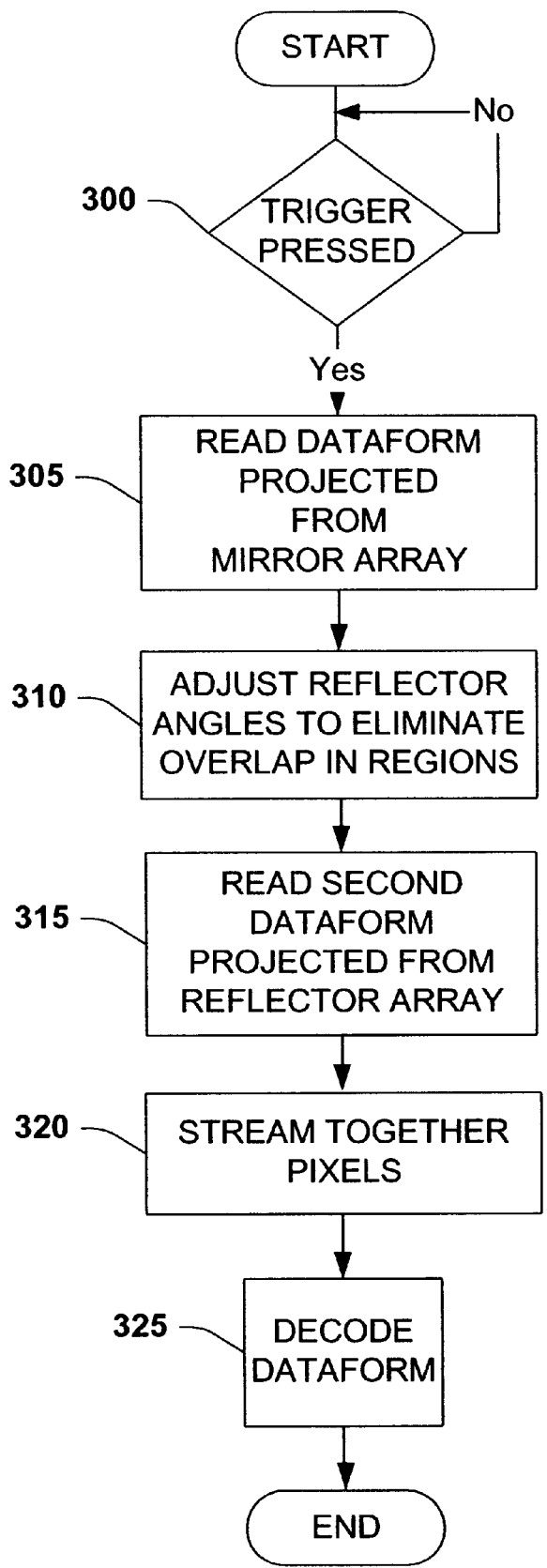
FIG. 7 is a flowchart representing the operation of the portable data collection device in accordance with another aspect of the present invention.

Turning now to FIG. 7, a flow chart depicting an alternate operation of the microprocessor 200 in reading a dataform 45a is shown. In particular, beginning at step 300, the microprocessor 200 initially determines whether the trigger 26 has been activated. If the trigger 26 has not been activated, the processor 200 returns to step 300. If, on the other hand, the trigger 26 has been activated, the processor 200 proceeds to step 305. In step 305, the processor 200 captures the dataform image in accordance with the techniques discussed above. In particular, using a laser illumination assembly 42 and the piezoelectric reflector array 43a, the dataform 45a is captured on respective zones 48a through 48i of the photosensor array 48 so as to increase the apparent horizontal resolution of the photosensor array 48. In step 310, the processor 200 adjusts the reflector angles to eliminate the overlapping portions in the FOV of the reflectors. In step 315, the processor 200 captures a second dataform image in accordance with the techniques discussed above. Next, in step 320, the processor 200 streams together the pixel data from each zone of the photosensor array 48. Finally, in step 325, the processor 200 decodes the data stream extrapolated from the respective zones 48a through 48i. Accordingly, the data collection device 10 is able to read dataforms at a higher apparent resolution by eliminating the overlapping regions and maximizing the number of pixels captured for each FOV.

Figure 8:
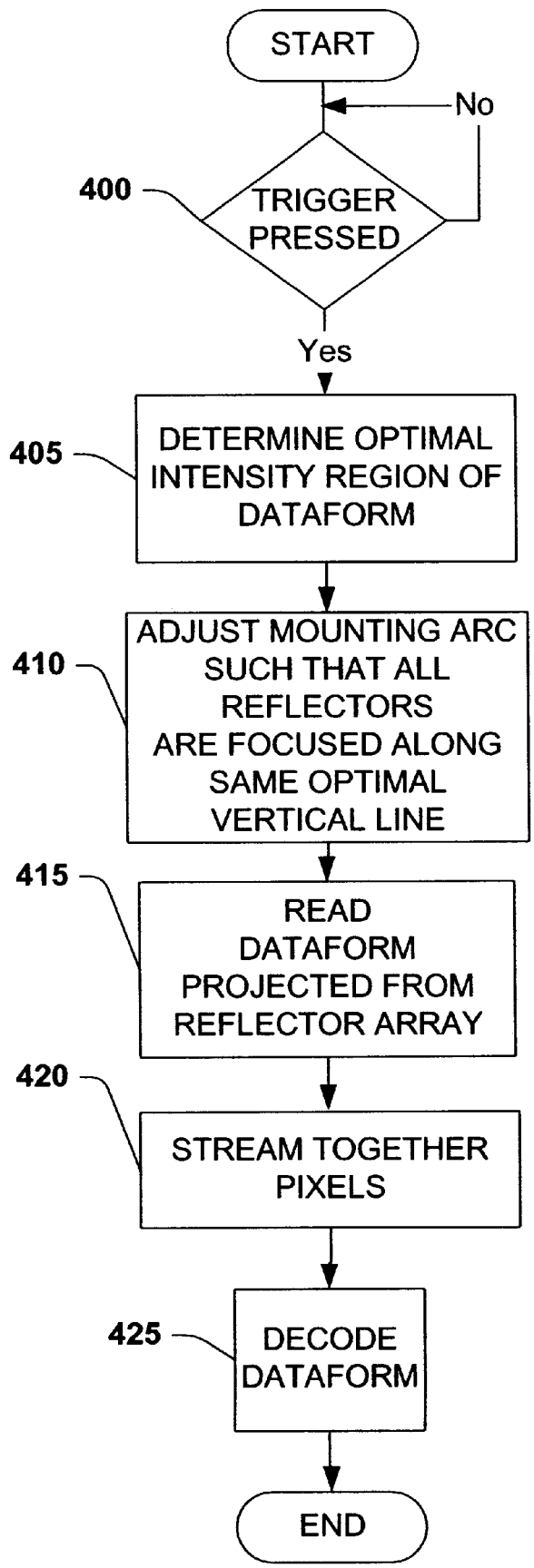
FIG. 8 is a flowchart representing the operation of the portable data collection device in accordance with yet another aspect of the present invention.

FIG. 8 illustrates yet another methodology of a flow chart depicting possible operations of the microprocessor 200 in reading a dataform 45a. In particular, beginning at step 400, the microprocessor 200 initially determines whether the trigger 26 has been activated. If the trigger 26 has not been activated, the processor 200 returns to step 400. If, on the other hand, the trigger 26 has been activated, the processor 200 proceeds to step 405. In step 405, the processor 200 determines the optimal intensity region of the dataform, for example, by employing another piezoelectric reflector specific to this purpose. In step 410, the processor 200 adjusts a mounting arc so that all reflectors are focused along the same optimal vertical line based on the optimal intensity region measurement. In step 415, the processor 200 captures the dataform image in accordance with the techniques discussed above. Following the removal of duplicate pixel data, the processor 200 in step 420 streams together the remaining pixel data from each zone of the photosensor array 48. Finally, in step 425, the processor 200 decodes the data stream extrapolated from the respective zones 48a through 48i.

Figure 9:
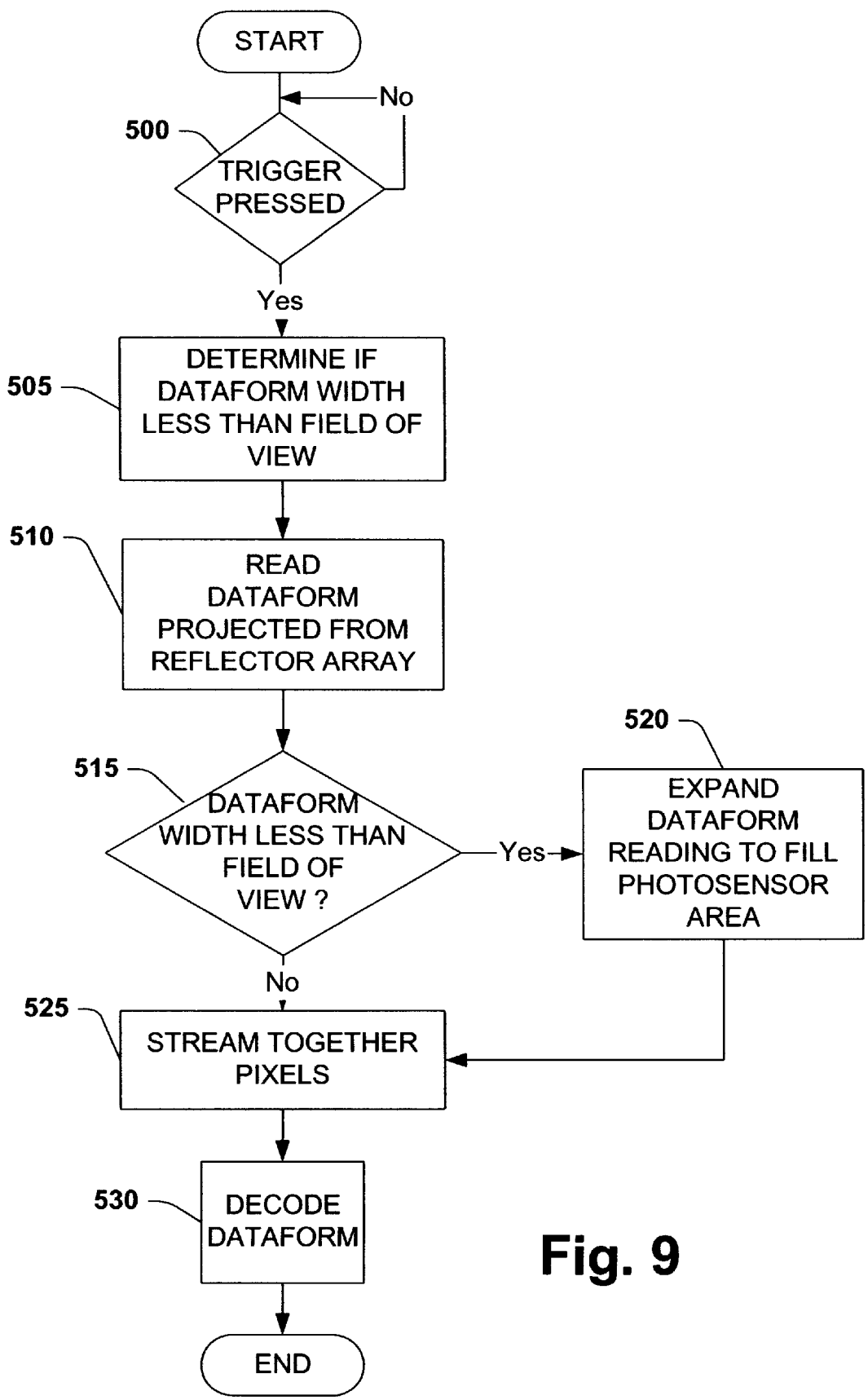
FIG. 9 is a flowchart representing the operation of the portable data collection device in accordance with yet another alternate aspect of the present invention.

FIG. 9 illustrates yet another methodology of a flow chart depicting possible operations of the microprocessor 200 in reading a dataform 45a. In particular, beginning at step 500, the microprocessor 200 initially determines whether the trigger 26 has been activated. If the trigger 26 has not been activated, the processor 200 returns to step 500. If, on the other hand, the trigger 26 has been activated, the processor 200 proceeds to step 505. In step 505, the processor 200 determines if the dataform width is less than the field of view, for example, by employing another piezoelectric reflector specific to this purpose. In step 510, the processor 200 captures the dataform image in accordance with the techniques discussed above. In step 515, the processor 200 determines if the dataform width is less than the field of view. If the dataform width is less than the field of view, the dataform reading is expanded to fill the photosensor area and then the processor advances to step 525. If the dataform width is not less than the field of view, the processor advances to step 525. Following the removal of duplicate pixel data, the processor 200 in step 525 streams together the remaining pixel data from each zone of the photosensor array 48. Finally, in step 530, the processor 200 decodes the data stream extrapolated from the respective zones 48a through 48i.

The invention has been described with reference to the preferred embodiments. Obviously, modifications and alterations will occur to others upon reading and understanding the preceding detailed description. For example, while the present embodiment of the invention depicts a piezoelectric reflector array 43a focused at a predetermined range, it is possible to include two or more different piezoelectric reflector arrays 43a each having sets of lenses varying in focus and/or magnification so that even greater ranging of the data collection device 10 is possible. Of course, in such situations the photosensor array 48 would correspondingly be of sufficient size to capture images for each of the additional piezoelectric reflectors in the piezoelectric reflector arrays. Further, while it has been described that a single photosensor array having multiple zones is used to capture the images from the respective different lens, it will be appreciated that multiple independent photosensor arrays could alternatively be used. Still further, while the above embodiments describe a system having nine piezoelectric reflectors, it will be appreciated that the present invention is intended to encompass any system having at least two piezoelectric reflectors. It is intended that the invention be construed as including all such modifications alterations, and equivalents thereof and is limited only by the scope of the following claims.

What is claimed is:

1. A dataform reading system, comprising:
   at least one photosensor;
   a lens for focusing a respective image representing a portion of a dataform taken along a target line onto a respective one of a plurality of different zones of the at least one photosensor;
   at least two piezoelectric reflectors configured to direct an image of adjacent and partially overlapping portions of the dataform taken along the target line onto the lens; and
   an illuminating device for illuminating the dataform.

2. The dataform reading system of claim 1, further including imaging processing circuitry configured to receive pixel data from each zone of the at least one photosensor and reconstruct an image of the dataform captured along the target line.

3. The dataform reading system of claim 2, wherein the imaging processing circuitry is configured to discard duplicate pixel data from the different zones during reconstruction of the image.

4. The dataform reading system of claim 2, wherein the imaging processing circuitry is configured to adjust a reflecting angle of at least one of the at least two piezoelectric reflectors for varying the partially overlapping segments of the dataform for a second reading.

5. The dataform reading system of claim 4, wherein the imaging processing circuitry is configured to reconstruct a second image of the dataform captured along the target line based on the adjusted reflected angle of the at least one of the at least two piezoelectric reflectors.

6. The dataform reading system of claim 5, wherein the imaging processing circuitry is configured to compare the overlap of the image and the overlap of the second image and discard the overlap portions of the dataform during reconstruction of a final image.

7. The dataform reading system of claim 2, wherein the imaging processing circuitry is configured to adjust a reflecting angle of at least one of the at least two piezoelectric reflectors for eliminating the overlapping segments of the dataform for a second reading.

8. The dataform reading system of claim 1, wherein the lens is a telephoto lens.

9. The dataform reading system of claim 1, wherein the piezoelectric reflectors are formed on a single substrate.

10. The dataform reading system of claim 1, wherein the photosensor is tilted with respect to the lens.

11. A dataform reader for reading a dataform, comprising:
a hand-portable sized housing having at least one lens;
a reading module included within the housing, the reading module comprising:
a photosensor array having a plurality of different zones;
a plurality of piezoelectric reflectors for directing a respective image representing a portion of the dataform along a target line onto a respective one of the plurality of different zones, the at least one lens configured to focus an image of adjacent and partially overlapping portions of the dataform along the target line; and
an illuminating device for illuminating the dataform.

12. The dataform reader of claim 11, further comprising an RF transceiver coupled to the reading module for transmitting and receiving wireless data.

13. The dataform reader of claim 11, further comprising a rechargeable battery disposed in the housing for providing power to the dataform reader.

14. The dataform reader of claim 11, further including imaging processing circuitry configured to receive pixel data from each zone of the photosensor array and reconstruct an image of the dataform captured along the target line.

15. The dataform reader of claim 14, wherein the imaging processing circuitry is configured to discard duplicate pixel data from the different zones during reconstruction of the image.

16. The dataform reading module of claim 14, wherein the imaging processing circuitry is configured to adjust a reflecting angle of at least one of the at least two piezoelectric reflectors for varying the partially overlapping segments of the dataform for a second reading.

17. The dataform reading module of claim 16, wherein the imaging processing circuitry is configured to reconstruct a second image of the dataform captured along the target line based on the adjusted reflected angle of the at least one of the at least two piezoelectric reflectors.

18. The dataform reading module of claim 17, wherein the imaging processing circuitry is configured to compare the overlap of the image and the overlap of the second image and discard the overlap portions of the dataform during reconstruction of a final image.

19. The dataform reading module of claim 14, wherein the imaging processing circuitry is configured to adjust a reflecting angle of at least one of the at least two piezoelectric reflectors for eliminating the overlapping segments of the dataform for a second reading.

20. A method for reading a dataform employing a dataform reading module, comprising the steps of:
focusing a plurality of images of a dataform onto respective zones of a photosensor array from at least two piezoelectric reflectors, at least two of the images received from the at least two piezoelectric reflectors corresponding to adjacent and partially overlapping segments of the dataform taken along a target line; and
reconstructing a final image of the dataform taken along the target line from a combination of the plurality of images provided to the respective zones.

21. The method of claim 20, further including the steps of adjusting a reflecting angle of at least one of the at least two piezoelectric reflectors for varying the partially overlapping segments of the dataform, focusing the plurality of images of the dataform onto respective zones of the photosensor array and reconstructing a second final image from the combination of the plurality of images.

22. The method of claim 21, further including the steps of comparing the overlap of the final image and the overlap of the second final image, discarding the overlap portions of the dataform stored in each of the respective zones and streaming together the plurality of images provided to the respective zones without the overlap into a single image.

23. The method of claim 20, further including the steps of adjusting a reflecting angle of at least one of the at least two piezoelectric reflectors for eliminating the partially overlapping segments of the dataform.

24. The method of claim 20, wherein a telephoto lens is employed to direct a corresponding plurality of images of the dataform onto the respective zones.

25. The method of claim 20, wherein the step of reconstructing the final image includes the steps of:
streaming together the plurality of images provided to the respective zones into a single image; and
discarding images of duplicate portions of the dataform stored in each of the respective zones.

26. The method of claim 20, further including the step of illuminating the dataform prior to the step of focusing.

27. A dataform reading system, comprising:
means for capturing adjacent portions of images of a dataform;
means for receiving images of captured adjacent portions of the dataform onto respective different regions of the means for capturing;
means for combining the images of the adjacent portions to a single image of the dataform; and
means for adjusting the width of the captured adjacent portions.

28. The dataform reading system of claim 27, wherein the adjacent portions of the dataform are each portions which partially overlap with one another.

29. The dataform reading system of claim 28, wherein the means for combining includes means for discarding duplicate data stored in each of the different zones.

30. The dataform reading system of claim 28, wherein the means for adjusting adjusts the width of the captured adjacent portions to eliminate the overlapping portions.

31. A dataform reading system, comprising:

at least one photosensor;

a lens for focusing a respective image representing a portion of a dataform taken along a target line onto a respective one of a plurality of different zones of the at least one photosensor;

at least two piezoelectric reflectors configured to direct an image of adjacent and partially overlapping portions of the dataform taken along the target line onto the lens;

an illuminating device for illuminating the dataform; and imaging processing circuitry configured to receive pixel data from each zone of the at least one photosensor and take a first reading of the dataform captured along the target line, the imaging processing circuitry further configured to adjust a reflecting angle of at least one of the at least two piezoelectric reflectors and take a second reading of the dataform captured along the target line wherein the image processing circuitry compares the partially overlapping portions of the first and second reading and discards the overlap portions of the dataform during reconstruction of a final image.

32. A dataform reading system, comprising:

at least one photosensor;

a lens for focusing a respective image representing a portion of a dataform taken along a target line onto a respective one of a plurality of different zones of the at least one photosensor;

at least two piezoelectric reflectors configured to direct an image of adjacent and partially overlapping portions of the dataform taken along the target line onto the lens;

an illuminating device for illuminating the dataform; and imaging processing circuitry configured to receive pixel data from each zone of the at least one photosensor and reconstruct an image of the dataform captured along the target line wherein the imaging processing circuitry is configured to adjust a reflecting angle of at least one of the at least two piezoelectric reflectors for taken at least one additional reading.

33. The dataform reading system of claim 32, wherein the reflecting angle of the at least one of the at least two piezoelectric reflectors is adjusted for eliminating the overlapping segments of the dataform for a second reading.

34. The dataform reading system of claim 32, wherein the reflecting angle of the at least one of the at least two piezoelectric reflectors is adjusted for at least one additional reading for comparison of the readings to determine a valid reading.

35. The dataform reading system of claim 34, wherein a reading is considered valid if any two readings match.

36. A method for reading a dataform employing a dataform reading module, comprising the steps of:

focusing a plurality of images of a dataform onto respective zones of a photosensor array from at least two piezoelectric reflectors, at least two of the images received from the at least two piezoelectric reflectors corresponding to adjacent and partially overlapping segments of the dataform taken along a target line, the at least two piezoelectric reflectors residing on a piezoelectric arc;

determining an optimal intensity region along the dataform;

adjusting the piezoelectric arc to focus the at least two piezoelctric reflectors along an optimal vertical line based on the determination of the optimal intensity region; and reconstructing a final image of the dataform taken along the target line from a combination of the plurality of images provided to the respective zones.

37. A method for reading a dataform employing a dataform reading module, comprising the steps of:

focusing a plurality of images of a dataform onto respective zones of a photosensor array from at least two piezoelectric reflectors, at least two of the images received from the at least two piezoelectric reflectors corresponding to adjacent and partially overlapping segments of the dataform taken along a target line;

determining if the dataform width is less than a field of view of the dataform reading module;

reconstructing a final image of the dataform taken along the target line from a combination of the plurality of images provided to the respective zones; and expanding the final image of the dataform to fill the photosensor array if the dataform width is less than the field of view of the dataform reading module.

* * * * *